(12) United States Patent
Ismert (10) Patent No.: US 7,481,321 B2
(45) Date of Patent: Jan. 27, 2009

(54) INTERCEPTOR FOR SEPARATING A MIXTURE

(75) Inventor: Martin B. Ismert, Milwaukee, WI (US)

(73) Assignee: Schier Products Company, New Berlin, WI (US)

( * ) Notice: Subject to any disclaimer, the term of this patent is extended or adjusted under 35 U.S.C. 154(b) by 7 days.

(21) Appl. No.: 11/693,969

(22) Filed: Mar. 30, 2007

(65) Prior Publication Data

US 2008/0237120 A1 Oct. 2, 2008

(51) Int. Cl.
*B01D 17/025* (2006.01)
(52) U.S. Cl. .................. 210/519; 210/532.1; 210/538
(58) Field of Classification Search ............... 210/519, 210/532.1, 538, 539, 540
See application file for complete search history.

(56) References Cited

U.S. PATENT DOCUMENTS

| | | | |
|---|---|---|---|
| 791,381 A | 5/1905 | Thompson | |
| 1,121,270 A | 12/1914 | McDermott | |
| 1,672,583 A | 6/1928 | Travers | |
| 1,741,187 A * | 12/1929 | Fuqua | 210/519 |
| 2,022,118 A | 11/1935 | Loeb | |
| 2,057,883 A * | 10/1936 | Dehn | 210/532.1 |
| 2,268,854 A * | 1/1942 | Boosey | 210/539 |
| 2,338,971 A * | 1/1944 | Ross | 210/539 |
| 2,355,305 A * | 8/1944 | Koenig | 210/519 |
| 2,414,949 A * | 1/1947 | Hirshstein | 210/538 |
| 2,602,465 A * | 7/1952 | Goehring | 210/519 |
| 2,792,125 A | 5/1957 | Gallacher | |
| 3,221,881 A | 12/1965 | Weiler et al. | |
| 4,235,726 A | 11/1980 | Shimko | |
| 4,298,470 A | 11/1981 | Stallings | |
| 4,722,800 A * | 2/1988 | Aymong | 210/519 |
| 4,732,397 A | 3/1988 | Gavin | |
| 4,886,605 A * | 12/1989 | Herve | 210/519 |
| 4,951,914 A | 8/1990 | Meyers et al. | |
| 4,983,284 A | 1/1991 | Batten | |
| 5,133,881 A | 7/1992 | Miller et al. | |
| 5,204,000 A * | 4/1993 | Steadman et al. | 210/519 |
| 5,271,853 A | 12/1993 | Batten | |

(Continued)

OTHER PUBLICATIONS

Water Environment Federation, Fats, Oils, & Grease (FOG) Management Workshop, Sep. 12 & 13, 2006, Chicago, Illinois.

(Continued)

*Primary Examiner*—Christopher Upton
(74) *Attorney, Agent, or Firm*—Michael Best & Friedrich LLP (57) ABSTRACT

An interceptor configured to at least partially separate a mixture of a first material and a second material, the first material being a fluid. The interceptor includes a container having a base and a sidewall portion that extends upwardly from the base to at least partially define a separation chamber configured to receive the mixture and to facilitate separation of the first and second materials. The interceptor further includes an inlet aperture and an inlet diffuser. The inlet aperture is configured to provide fluid communication between the separation chamber and an inlet conduit that delivers the mixture to the interceptor. The inlet diffuser is in fluid communication with the inlet aperture and the inlet diffuser includes a body portion located within the separation chamber and an elongated outlet aperture that extends through the body portion to provide fluid communication between the inlet conduit and the separation chamber.

20 Claims, 10 Drawing Sheets

U.S. PATENT DOCUMENTS

| | | | |
|---|---|---|---|
| 5,360,555 | A | 11/1994 | Batten |
| 5,492,619 | A | 2/1996 | Batten |
| 5,505,860 | A * | 4/1996 | Sager .................. 210/519 |
| 5,543,064 | A | 8/1996 | Batten |
| 5,554,301 | A * | 9/1996 | Rippetoe et al. ........... 210/540 |
| 5,746,912 | A | 5/1998 | Monteith |
| 5,934,309 | A | 8/1999 | Batten |
| 6,068,765 | A * | 5/2000 | Monteith ................ 210/519 |
| 6,231,762 | B1 | 5/2001 | Marshall, III |
| 6,413,435 | B1 | 7/2002 | Kyles et al. |
| 6,491,830 | B1 | 12/2002 | Batten et al. |
| 6,622,317 | B1 | 9/2003 | Oropallo et al. |
| 6,772,789 | B1 | 8/2004 | Terry, III et al. |
| 6,800,195 | B1 | 10/2004 | Batten et al. |
| 6,878,270 | B1 | 4/2005 | Batten et al. |
| 7,011,752 | B2 | 3/2006 | Broeders et al. |
| 2002/0166803 | A1 | 11/2002 | Mazurek et al. |
| 2003/0141303 | A1 | 7/2003 | Grazziotin |
| 2004/0163446 | A1 | 8/2004 | Ball et al. |
| 2004/0222149 | A1 * | 11/2004 | Abrams .................. 210/519 |
| 2006/0096928 | A1 | 5/2006 | Broeders et al. |

OTHER PUBLICATIONS

Photographs of Prior Art Interceptor—Admitted Prior Art.
Schier Products Company, 2004, Pioneering Drain Line Purity, Catalog #104, pp. 20-51, pp. 80-86 and pp. 92-93.
Rockford Separators RTO Series Triple Outlet Grease Separators, www.rkfdseparators.com/catalog/css/catalog_14.html.
Green Turtle, Proceptor; greenturtletech.com/proceptor.
Counterline, Grease Interceptors, CLPB-2006-U.S., pp. 14-15.

* cited by examiner

INTERCEPTOR FOR SEPARATING A MIXTURE

BACKGROUND

The present invention relates to interceptors utilized to separate mixtures.

Interceptors are often utilized to separate components of a mixture by allowing the components to separate through the use of gravity. Interceptors typically include a tank or container that receives the mixture to be separated. While in the container, the relatively less dense components of the mixture float or rise while the relatively more dense components fall or sink. For example, in one application, interceptors are utilized to separate grease, water, and solids. The interceptor receives the grease and water mixture, often from a kitchen sink. While in the tank of the interceptor, the grease and water separate such that the grease floats on the water and any solids in the mixture sink. Then, the water is removed from the interceptor below the layer of floating grease. Typically, the grease is periodically removed from the interceptor by opening the tank and manually removing the grease layer.

SUMMARY

In one embodiment, the invention provides an interceptor configured to at least partially separate a mixture of a first material and a second material, the first material being a fluid. The interceptor includes a container having a base and a sidewall portion that extends upwardly from the base to at least partially define a separation chamber configured to receive the mixture and to facilitate separation of the first and second materials. The interceptor further includes an inlet aperture and an inlet diffuser. The inlet aperture is configured to provide fluid communication between the separation chamber and an inlet conduit that delivers the mixture to the interceptor. The inlet diffuser is in fluid communication with the inlet aperture and the inlet diffuser includes a body portion located within the separation chamber and an elongated outlet aperture that extends through the body portion to provide fluid communication between the inlet conduit and the separation chamber.

In another embodiment, the invention provides an interceptor configured to at least partially separate a mixture of a first material and a second material, the first material being a fluid. The interceptor includes a container having a base and a sidewall portion that extends upwardly from the base to at least partially define a separation chamber configured to receive the mixture and to facilitate separation of the first and second materials. The interceptor further includes an inlet aperture and an inlet diffuser. The inlet aperture is configured to provide fluid communication between the separation chamber and an inlet conduit that delivers the mixture to the interceptor. The inlet diffuser includes an inlet flow control orifice that restricts a flow of the mixture and a body portion located within the separation chamber. The body portion includes an outlet aperture that extends through the body portion to provide fluid communication between the inlet conduit and the separation chamber.

In yet another embodiment, the invention provides an interceptor configured to at least partially separate a mixture of a first material and a second material, the first material being a fluid and the interceptor defining a static fluid line. The interceptor includes a container having a base and a sidewall portion that extends upwardly from the base to at least partially define a separation chamber configured to receive the mixture and to facilitate separation of the first and second materials. The interceptor further includes an inlet aperture and an inlet diffuser. The inlet aperture is configured to provide fluid communication between the separation chamber and an inlet conduit that delivers the mixture to the interceptor. The inlet diffuser is in fluid communication with the inlet aperture, and the inlet diffuser includes a body portion located within the separation chamber. The body portion defines a cavity. The inlet diffuser further includes an outlet aperture that extends through the body portion below the static fluid line to provide fluid communication between the inlet conduit and the separation chamber, and a vent aperture that extends through the body portion above the static fluid line to provide fluid communication between the cavity and the separation chamber.

In yet another embodiment, the invention provides an interceptor configured to at least partially separate a mixture of a first material and a second material, the first material being a fluid. The interceptor includes a container having a base and a sidewall portion that extends upwardly from the base to at least partially define a separation chamber configured to receive the mixture and to facilitate separation of the first and second materials. The interceptor further includes an inlet aperture, an inlet flow control orifice, and an inlet diffuser. The inlet aperture is configured to provide fluid communication between the separation chamber and an inlet conduit that delivers the mixture to the interceptor. The inlet flow control orifice is configured to reduce a flow of the mixture prior to entering the separation chamber, the inlet flow control orifice defining an area. The inlet diffuser is in fluid communication with the inlet aperture. The inlet diffuser includes a body portion located within the separation chamber and an outlet that extends through the body portion to provide fluid communication between the inlet conduit and the separation chamber, the outlet defining an area. A ratio is defined as the area of the outlet of the inlet diffuser divided by the area of the inlet flow control orifice, and the ratio is between about 30 and 50.

Other aspects of the invention will become apparent by consideration of the detailed description and accompanying drawings.

BRIEF DESCRIPTION OF THE DRAWINGS

FIG. 5b is a perspective view of an alternative construction of the inlet diffuser of FIG. 5a.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
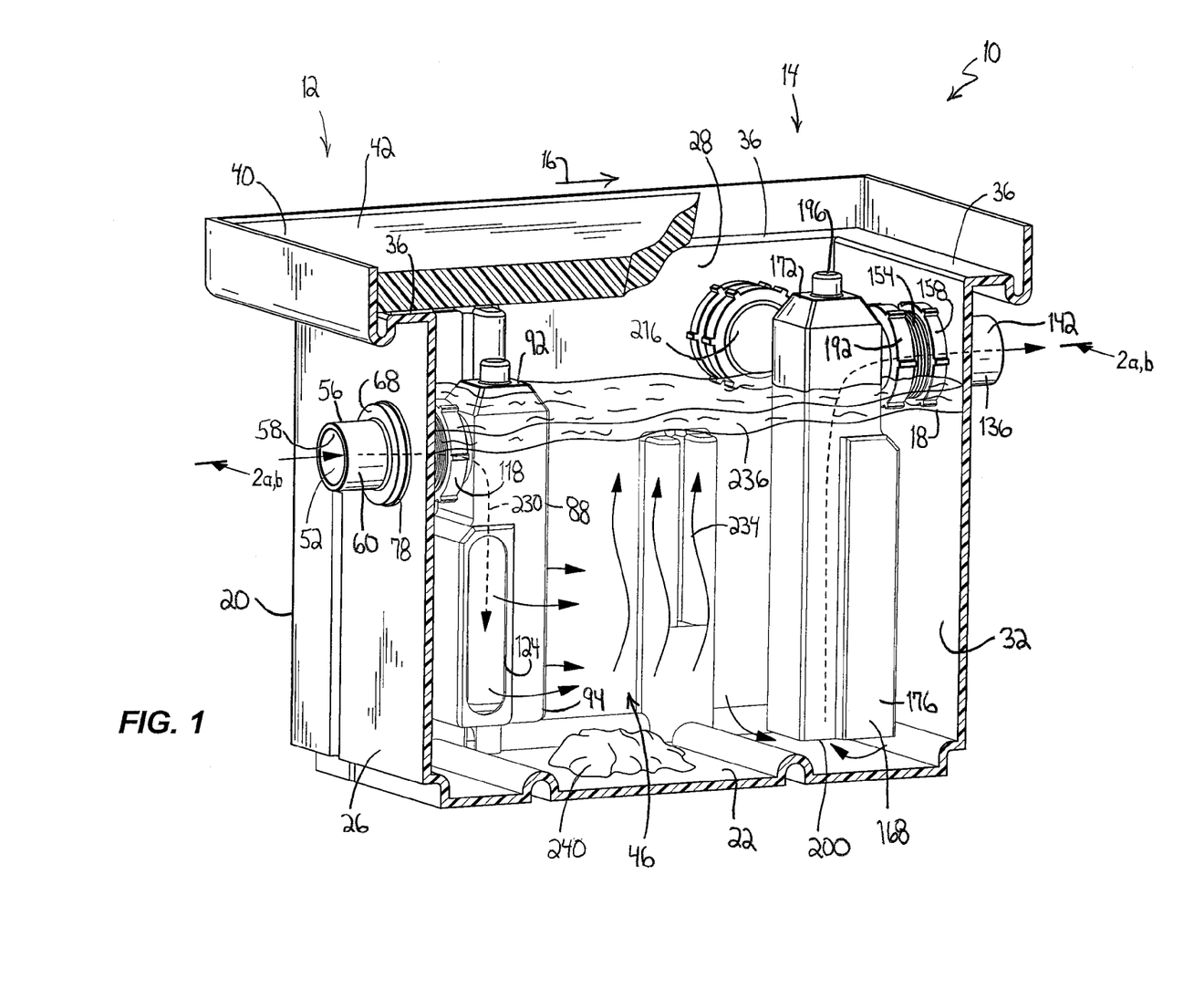
FIG. 1 is a cross-sectional perspective view of an interceptor embodying the present invention taken along line 1-1 of FIG. 3 with a portion of a cover of the interceptor removed for clarity.

FIG. 1 illustrates an interceptor 10 utilized to separate a mixture. While the illustrated interceptor 10 is a grease interceptor that is particularly suited for separating a mixture of grease, water and solids, in other constructions, the interceptor can be a solids interceptor, chemical dilution tank, and the like that can separate any suitable mixture.

The interceptor 10 defines an inlet end portion 12 and an outlet end portion 14. As will be discussed in more detail below, the mixture enters the inceptor 10 at the inlet end portion 12 and travels toward the outlet end portion 14 to generally define a mixture flow direction, represented by arrow 16. Also, as will be discussed in more detail below, the interceptor 10 defines a static water or fluid line 18. As would be understood by one of skill in the art, the static fluid line 18 is located approximately at the bottom of the interceptor outlet. In other words, the interceptor 10 generally empties to the static fluid line 18. Whereas, as would be understood by one of skill in the art, an active fluid line is defined as the height to which the interceptor 10 fills during operation of the interceptor. The height of the active fluid line can vary depending on the flow rate of the mixture entering the interceptor 10, but is generally above the static fluid line 18.

Figure 3:
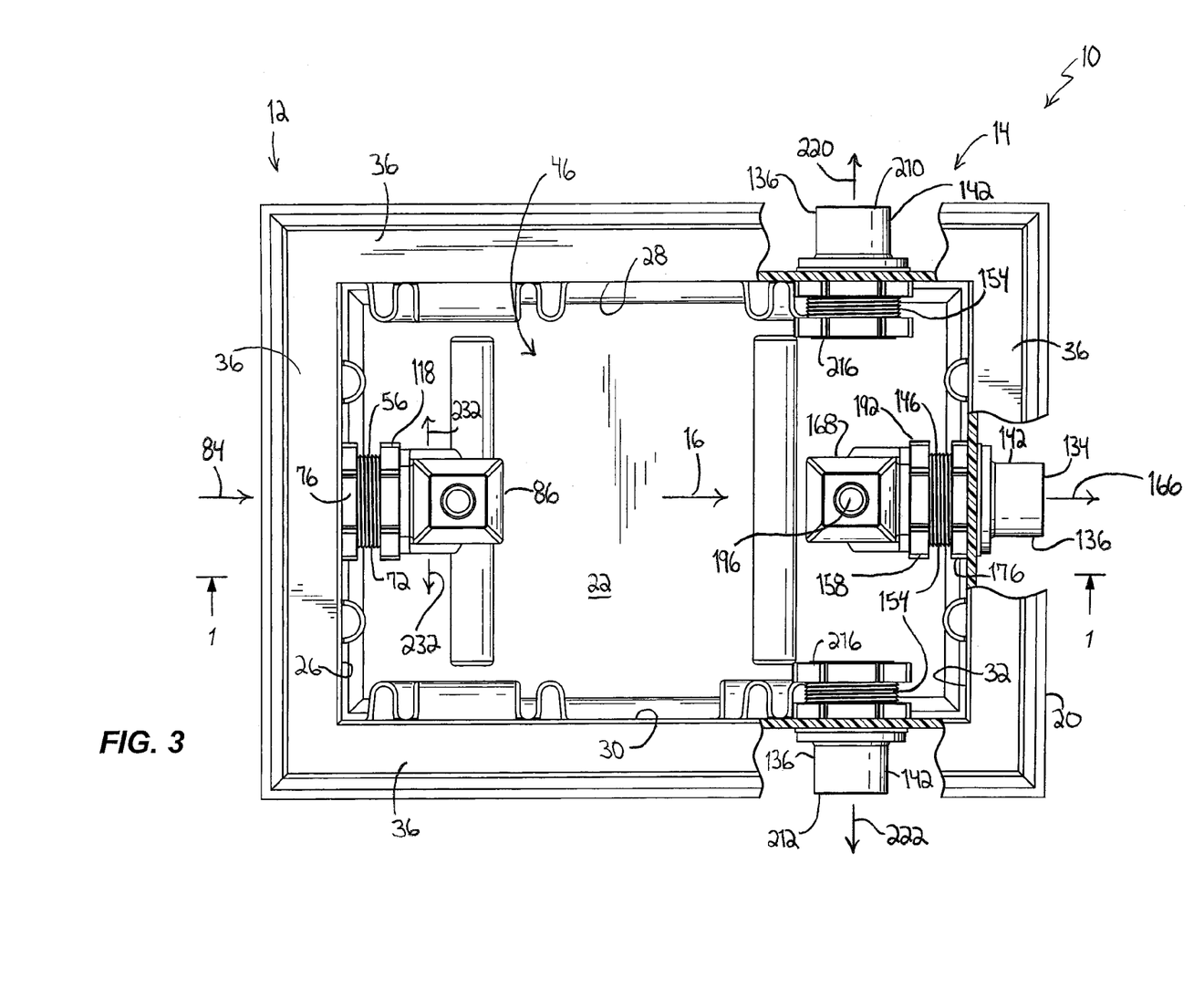
FIG. 3 is a top view of the interceptor of FIG. 1 with the cover removed and portions of the interceptor container removed for clarity.

Referring to FIGS. 1 and 3, the interceptor 10 includes a container 20 having a base 22 and a sidewall portion that includes sidewalls 26, 28, 30, and 32 that extend upwardly from the base 22. A cover receiving portion 36 extends from the top of the sideswalls 26, 28, 30, and 32. As illustrated in FIG. 1, a cover 40 is received in the cover receiving portions 36. The cover 40 includes a top surface 42, and in one construction the top surface 42 is a high-grip or relatively high friction surface. In one application of the interceptor 10, the interceptor 10 is installed in-ground or with the cover 40 generally flush with a floor, and the high-grip top surface 42 facilitates friction if someone walks across the cover 40.

In one construction, the container 20 is molded from high density polyethylene to inhibit corrosion and leaking of the container 20. In other constructions, the container can be formed from other suitable materials using any suitable method.

Figure 4:
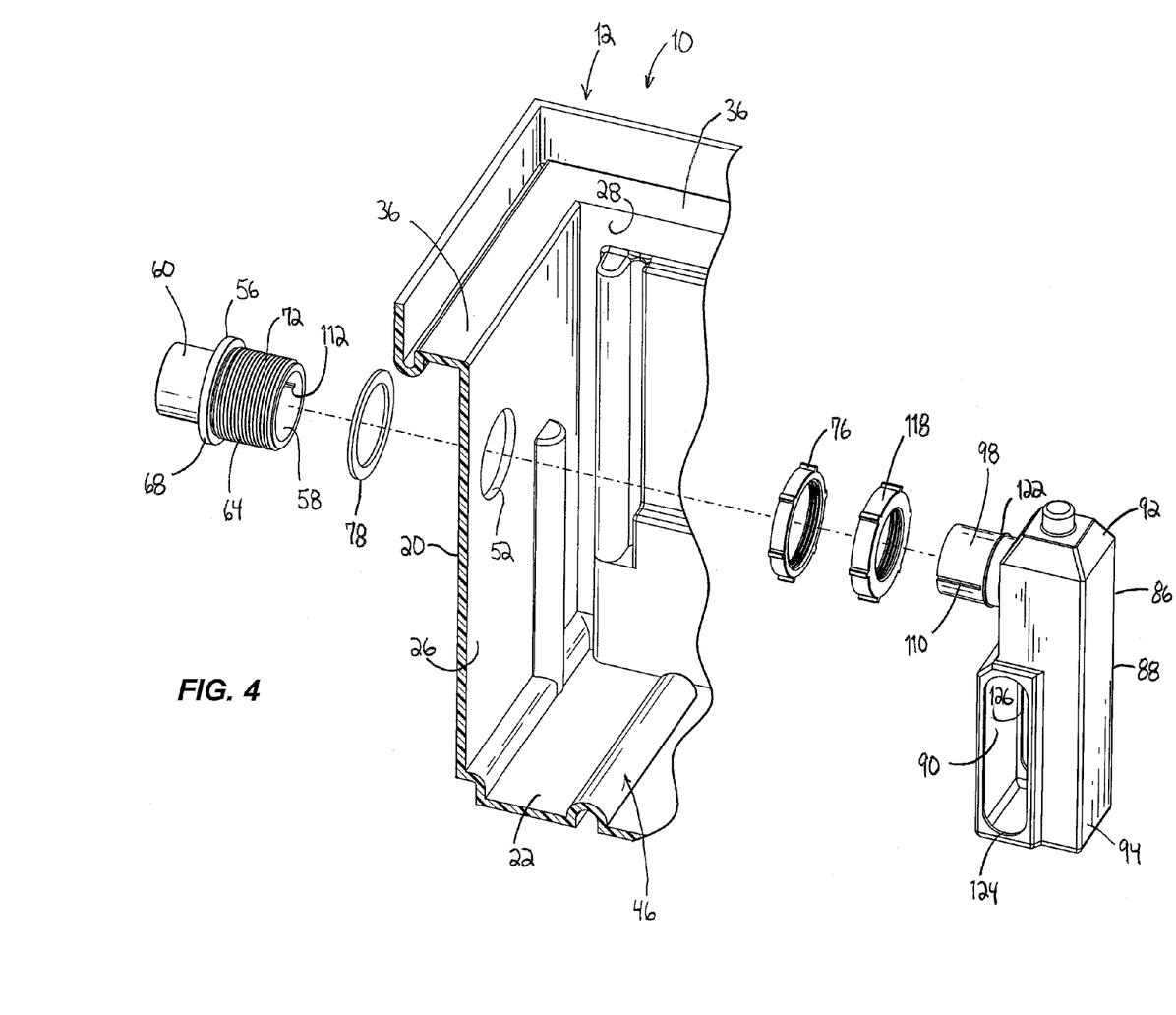
FIG. 4 is an exploded view of an inlet assembly of the interceptor of FIG. 1.

Together the cover 40, the base 22, and the sidewalls 26, 28, 30, 32 of the container 20 define a separation chamber 46. Referring to FIG. 4, an inlet aperture 52 extends through the sidewall 26 of the container 20 to provide fluid communication between the exterior of the container 20 and the separation chamber 46.

Figure 2A:
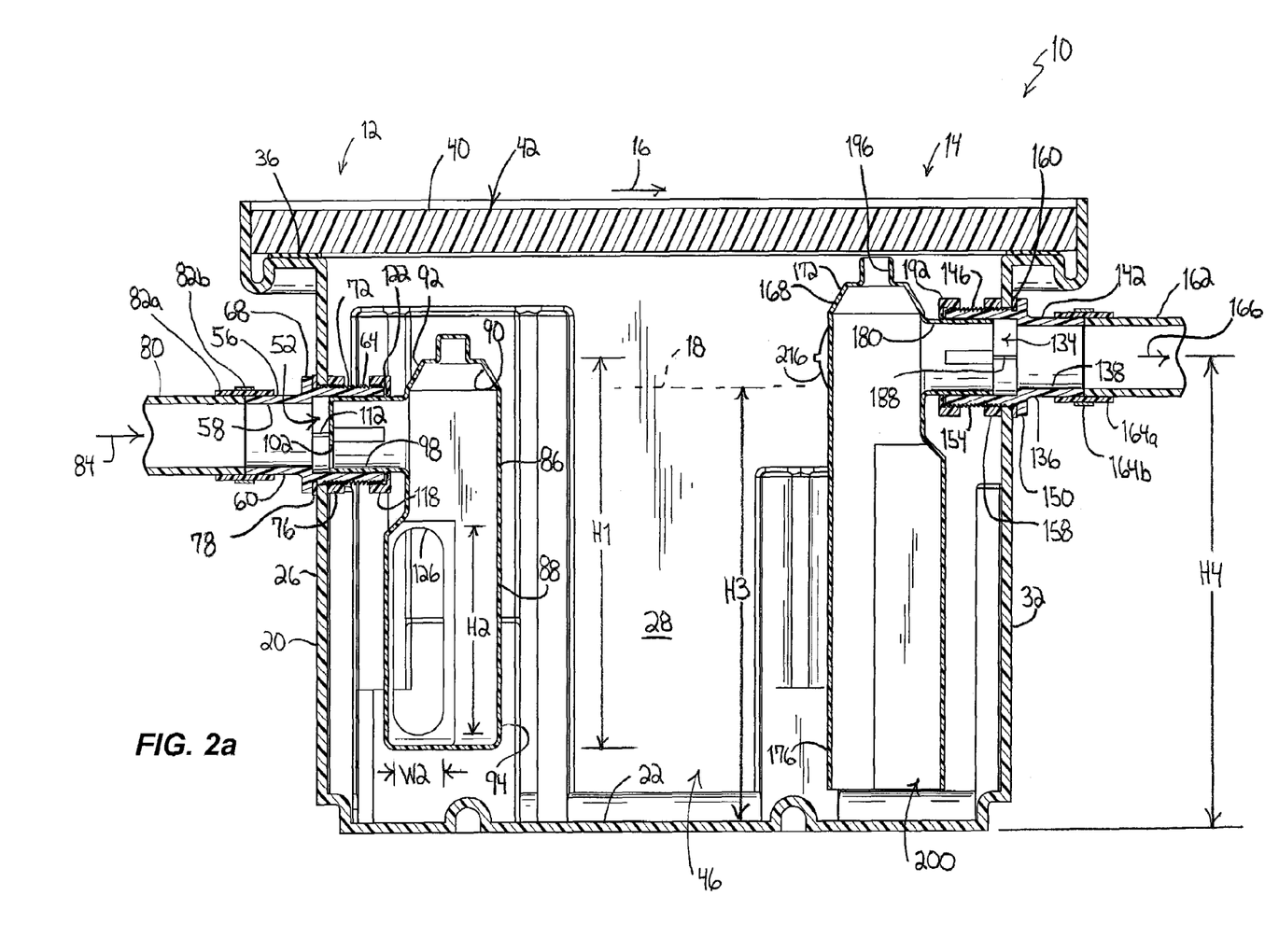
FIG. 2a is a cross-sectional view of the interceptor of FIG. 1 taken along line 2a-2a of FIG. 1.

As best seen in FIGS. 2a and 4, an inlet coupling 56 extends through the inlet aperture 52. The inlet coupling 56 includes a bore 58, an inlet pipe coupling portion 60, an attachment portion 64, and a flange 68. In the illustrated construction, the attachment portion 64 includes a threaded exterior surface 72 that receives a fastener or nut 76. As best seen in FIG. 2a, the nut 76 is threaded onto the exterior surface 72 of the attachment portion 64 to capture a portion of the sidewall 26 between the nut 76 and the flange 68 to secure the coupling 56 to the container 20. A gasket 78 is located between the sidewall 26 and the flange 68. In one construction, the gasket 78 is a high temperature neoprene gasket, and in other constructions, the gasket 78 can be formed from any suitable material.

With continued reference to FIG. 2a, the inlet pipe coupling portion 60 couples to an inlet pipe 80 that supplies the mixture to be separated by the interceptor 10. A rubber sleeve 82a and a clamp 82b are utilized to couple the inlet pipe 80 and the inlet coupling 56. Of course, in other constructions, other suitable devices and methods can be utilized to couple the inlet pipe 80 and the inlet coupling 56.

As will be discussed in more detail below, the inlet pipe 80 supplies the mixture to the interceptor 10. Referring to FIGS. 2a and 3, the mixture travels through the inlet pipe 80 and travels through the inlet aperture 52 to define an inlet flow direction, generally represented by arrow 84 of FIGS. 2a and 3.

Referring to FIGS. 2a and 4, an inlet diffuser 86 is coupled to the inlet coupling 56. The inlet diffuser 86 includes a substantially hollow housing or body 88 that defines a cavity 90. The inlet diffuser 86 includes a top portion 92, a bottom portion 94, and the inlet diffuser defines a height H1. The inlet diffuser 56 includes a generally cylindrical coupling portion 98 that is located adjacent the top portion 92. In one construction the inlet diffuser 86 is molded from high temperature polypropylene such that the inlet diffuser 86 is integrally formed as a single piece.

Figure 5A:
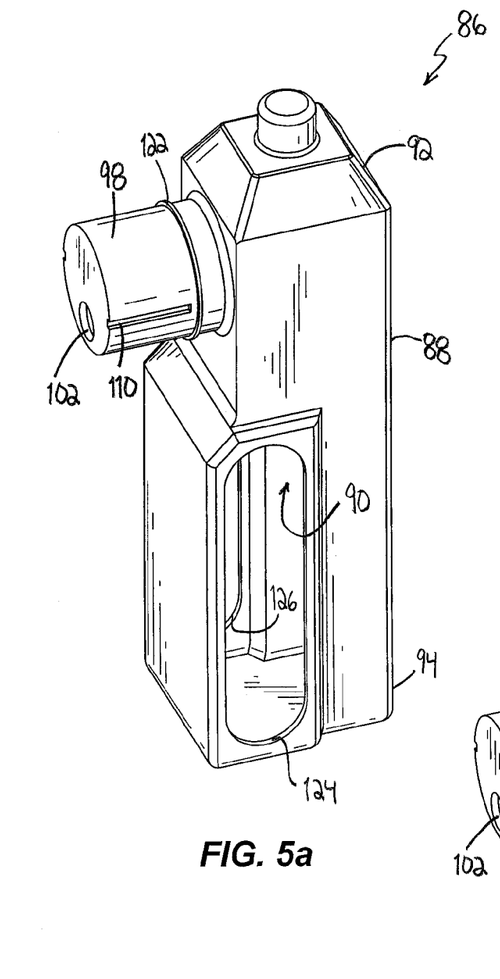
FIG. 5a is a perspective view of an inlet diffuser of the interceptor of FIG. 1.

Referring to FIGS. 2a and 5a, the coupling portion 98 of the inlet diffuser 86 includes a flow control orifice 102 that defines an inlet of the diffuser 86. The flow control orifice 102 defines an area that, as would be understood by one of skill art, is less than the cross sectional area of the inlet pipe 80 such that the orifice 102 reduces a flow rate of the mixture entering the separation chamber 46.

Recesses 110 are formed in the coupling portion 98. The recesses 110 each receive a protrusion 112 (see FIG. 4) that extends from the bore 58 of the inlet coupling 56 to prevent rotation of the diffuser 86 with respect to the inlet coupling 56. A locking collar 118 is retained on the coupling portion 98 of the diffuser 86 by a flange 122 that radially extends from the coupling portion 98. As best seen in FIG. 2a, the threaded locking collar 118 couples to the threaded exterior surface 72 of the inlet coupling 56 such that the flange 122 of the inlet diffuser 86 is captured between the collar 118 and the inlet coupling 56 to removably couple the inlet diffuser 86 to the inlet coupling 56.

Referring to FIGS. 1 and 5a, the inlet diffuser 86 further includes an outlet formed by outlet apertures 124 and 126 that extend through the body 88 beneath the static fluid line 18. The outlet apertures 124 and 126 are generally the same, and therefore, only the outlet aperture 126 will be discussed in detail below. Referring to FIG. 2a, the outlet aperture 126 defines a height H2 and a width W2. The illustrated outlet aperture 126 is an elongated aperture such that the height H2 is greater than the width W2. An aspect ratio of the aperture 126 is defined as the height H2 divided by the width W2 (i.e., H2/W2). In the illustrated construction, the aspect ratio H2/W2 is approximately 4. In other constructions, the aspect ratio H2/W2 is greater than about 3, in yet other constructions, the aspect ratio H2/W2 is greater than about 2, and in yet other constructions, the aspect ratio H2/W2 is greater than 1.

Referring to FIG. 5a, each of the outlet apertures 124 and 126 defines an area, and together the outlet apertures 124 and 126 define an outlet area. A ratio is defined as the outlet area divided by the area of the flow control orifice 102. In the illustrated construction, the ratio is approximately 40. In other constructions, the ratio can range from about 38 to about 47, and in yet other constructions the ratio can range from about 30 and to about 50. Still, in yet other constructions, the ratio is at least about 38.4 and ranges from about 38.4 to about 46.7. It has been found that a ratio defined as the outlet area divided by the area of the flow control orifice of about 40 provides an outlet velocity of the mixture at the outlets 124 and 126 of about 5 inches per second in many applications. Such a velocity at the outlets 124 and 126 has been found to allow the mixture to enter the separation chamber 46 with minimal disruption to the separated components that are stored in the separation chamber 46 while still maintaining an acceptable flow rate into the separation chamber 46.

Referring to FIG. 2a, another ratio is defined as the height H2 of one of the outlet apertures 124 and 126 divided by the height of the inlet diffuser H1 (i.e., H2/H1). In the illustrated construction, the ratio H2/H1 is approximately 0.5, and in other constructions, the ratio H2/H1 is greater than about 0.4, and in yet other constructions the ratio H2/H1 can be less than 0.4.

With continued reference to FIG. 2a, the outlet apertures 124 and 126 are vertically elongated such that another ratio is defined as the height H2 of one of the outlet apertures 124 and 126 divided by a height H3 of the static fluid line 18 above the base 22 (i.e., H2/H3). In one construction, the ratio H2/H3 is approximately 0.52. In other constructions, the ratio H2/H3 ranges from about 0.32 to about 0.66. In yet other constructions, the ratio H2/H3 can be less than 0.32 or greater than 0.66.

Figure 2B:
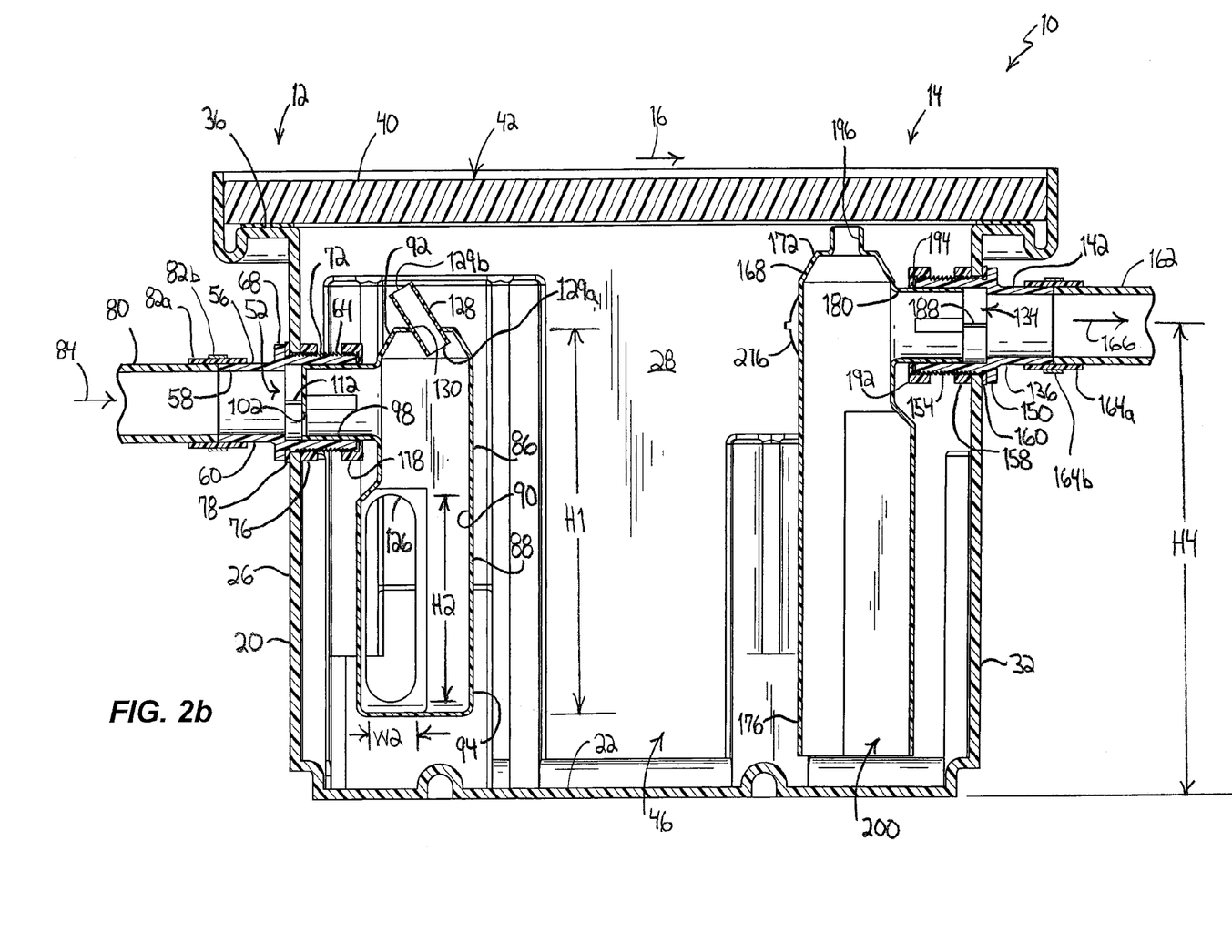
FIG. 2b is a view similar to FIG. 2a, illustrating an alternative construction of an inlet diffuser.

FIG. 2b illustrates an alternative construction of the inlet diffuser 86 where the inlet diffuser 86 includes a vent 128. The vent 128 can be formed from a piece of molded plastic, plastic tubing, and the like such that the vent 128 defines a vent passageway having an first end 129a and a second end 129b. The vent 128 extends through a vent aperture 130 formed in the top portion 92 of the inlet diffuser 86 and extends into the cavity 90 such that a portion of the first end 129a of the vent 128 is located below the static fluid line 18 (FIG. 1). In other constructions, the first end 129a of the vent 128 can be located entirely above the static fluid line 18. Also, in the illustrated construction, the vent 128 is angled approximately 45 degrees toward the sidewall 26 of the container 20. Such an angular orientation of the vent 128 has been found to substantially prevent the mixture that enters the interceptor 10 through the inlet diffuser 86 from flowing through the vent 128 and thus bypassing the outlet apertures 124 and 126 of the inlet diffuser 86.

During operation of the interceptor 10, the vent 128 provides fluid communication between the cavity 90 of the inlet diffuser 86 and the separation chamber 46 above the active fluid line by allowing air within in the inlet pipe 80 to pass through the vent 128. The vent 128 reduces the amount of pressured air entrained in the mixture at the outlets 124 and 126 by allowing air or other gases to pass through the vent 128. For example, if the inlet pipe 80 is substantially empty (i.e., does not include the mixture to be separated), but includes air, the air passes through the vent 128 when the mixture flows from a source through the inlet pipe 80. As stated above, the angular orientation of the vent 128 substantially prevents the mixture that enters the interceptor 10 through the inlet diffuser 86 from flowing through the vent 128 and thus bypassing the outlet apertures 124 and 126 of the inlet diffuser 86.

Figure 5B:
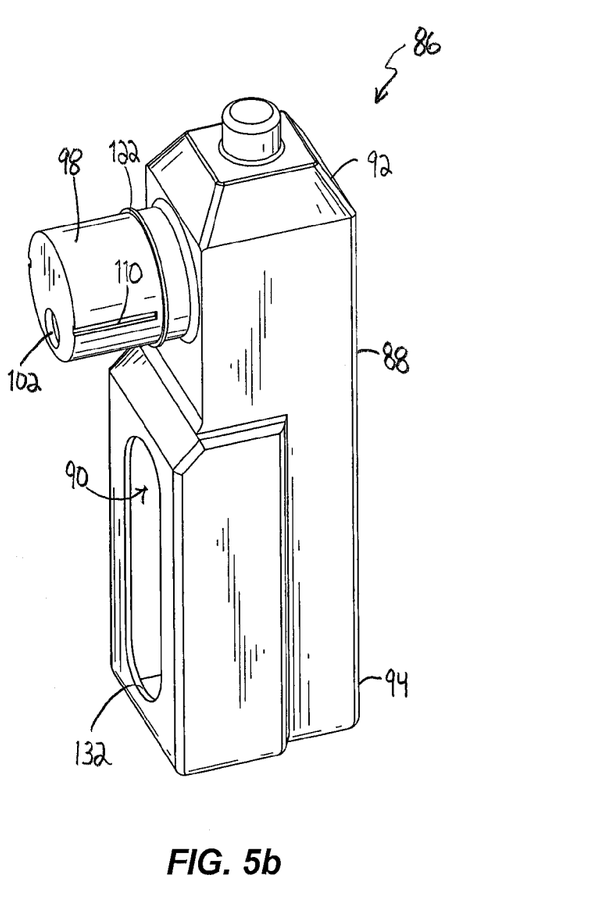

FIG. 5b illustrates yet another construction of the inlet diffuser 86. The inlet diffuser 86 of FIG. 5b includes a single outlet aperture 132 that extend through the body portion 88. In the illustrated construction, the area of the outlet aperture 132 is equal to or approximately equal to the total outlet area defined by the apertures 124 and 126 of the inlet diffuser 86 of FIG. 5a (i.e., area of outlet aperture 132 is approximately the area of aperture 124 plus the area of aperture 126). When the diffuser 86 of FIG. 5b is coupled to the container 20 of FIG. 2a, the outlet aperture 132 opens toward the sidewall 26 that includes the inlet aperture 52 or opposite the mixture flow direction 16. Such a configuration of the outlet aperture 132 of the inlet diffuser 86 increases the distance that the mixture must travel in the mixture flow direction 16 (FIG. 2a), which facilitates increased separation of the mixture.

Referring to FIG. 2a, the container 20 further includes an outlet aperture 134 that extends through the sidewall 32 that is opposite the sidewall 26 that includes the inlet aperture 52. The outlet aperture 134 is located a distance H4 above the base 22 of the container 20.

An outlet coupling 136, similar to the inlet coupling 56, extends through the outlet aperture 134. The outlet coupling 136 includes a bore 138, an outlet pipe coupling portion 142, an attachment portion 146, and a flange 150. In the illustrated construction, the attachment portion 146 includes a threaded exterior surface 154 that receives a fastener or nut 158. The nut 158 is threaded onto the exterior surface 154 of the attachment portion 146 to capture a portion of the sidewall 32 between the nut 158 and the flange 150 to secure the coupling 136 to the container 20.

A gasket 160 is located between the sidewall 32 and the flange 150. In one construction, the gasket 160 is a high temperature neoprene gasket, and in other constructions the gasket 160 can be formed from any suitable material. The outlet pipe coupling portion 142 couples the interceptor 10 to an outlet pipe 162. In the illustrated construction, the outlet pipe 162 is coupled to the outlet coupling 136 using a rubber sleeve 164a and a clamp 164b. In one application, the outlet pipe 162 transports the material, fluid, etc., that exits the interceptor 10 to a sewer.

Referring to FIGS. 2a and 3, the outlet aperture 134 defines an outlet flow direction, represented by arrow 166. The outlet flow direction 166 is generally parallel to the inlet flow direction 84, and in the illustrated construction the outlet flow direction 166 is vertically co-planar with the inlet flow direction 84.

Figure 6:
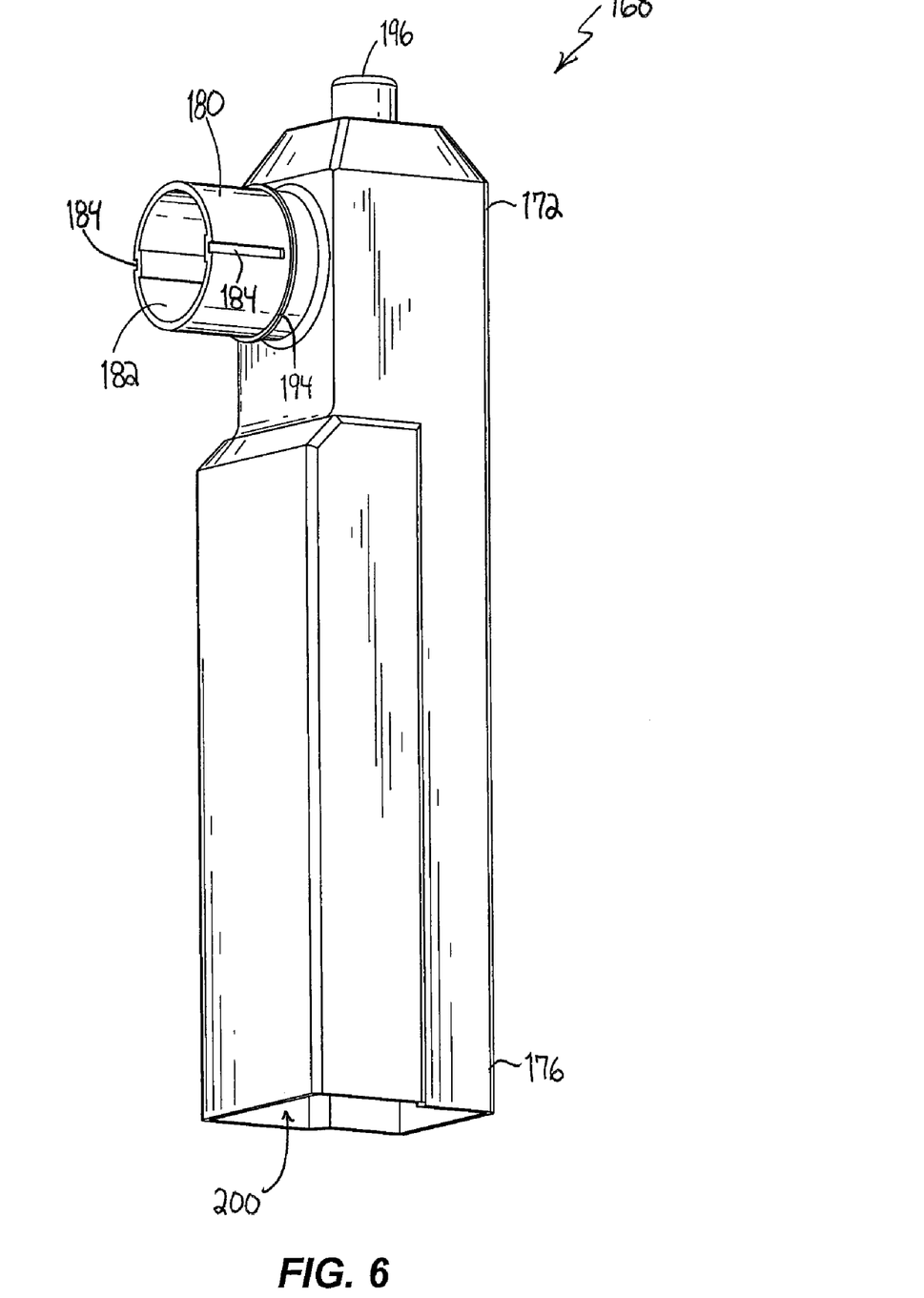
FIG. 6 is a perspective view of an outlet diffuser of the interceptor of FIG. 1.

Referring to FIGS. 2a and 6, an outlet conduit baffle 168 is coupled to the outlet coupling 136. The outlet baffle 168 is substantially hollow, and in one construction the outlet baffle 168 is molded from high temperature polypropylene. The outlet baffle 168 includes a top portion 172 and a bottom portion 176. A generally cylindrical coupling portion 180 is located adjacent the top portion 172. The coupling portion 180 defines an outlet 182 of the baffle 168, and the coupling portion 180 includes recesses 184 that are formed in the coupling portion 180. The recesses 184 each receive a protrusion 188 that extends from the bore 138 of the outlet coupling 136 to prevent rotation of the baffle 168 with respect to the outlet coupling 136. A locking collar 192 is retained on the coupling portion 180 of the baffle 168 by a flange 194 that radially extends from the coupling portion 180. As best seen in FIG. 2a, the threaded locking collar 192 couples to the threaded exterior surface 154 of the outlet coupling 136 such that the flange 194 of the baffle 168 is captured between the collar 192 and the outlet coupling 136 to removably couple the outlet baffle 168 to the coupling 136.

The top portion 172 of the baffle 168 further includes a vent aperture 196. The vent aperture 196 provides an air relief and anti-siphoning hole in the top portion 172 of the baffle 168 that allows the baffle 168 to breathe without additional venting through the sidewalls 26, 28, 30, 32 or the cover 40.

The bottom portion 176 of the baffle 168 defines an inlet aperture 200 of the baffle 168. As illustrated in FIG. 2a, when the outlet baffle 168 is coupled to the outlet coupling 136, the inlet aperture 200 of the baffle 168 is located slightly above the base 22 of the container 20. For example, in one construction of the interceptor 10, the inlet aperture 200 is about 2 inches from the base 22. Of course, in other constructions the inlet aperture 200 can be closer to or further from the base 22 depending on such factors as the size of the interceptor 10.

In the illustrated construction, the outlet conduit baffle 168 is similarly shaped to the inlet diffuser 86 and both the inlet diffuser 86 and the outlet baffle 168 are formed using a similar method and using similar materials. Like the inlet diffuser 86, in one construction the outlet baffle 168 is molded from high temperature polypropylene such that the outlet baffle 168 is integrally formed as a single piece. Both the inlet diffuser 86 and the outlet baffle 168 are made from similar blow molding tooling using inserts to vary the size. Post molding fabrication is utilized to form apertures in the diffuser 86 and the baffle 168, such as the inlet aperture 200 of the baffle 168 and the outlet apertures 124 and 126 of the inlet diffuser 86.

Figure 7:
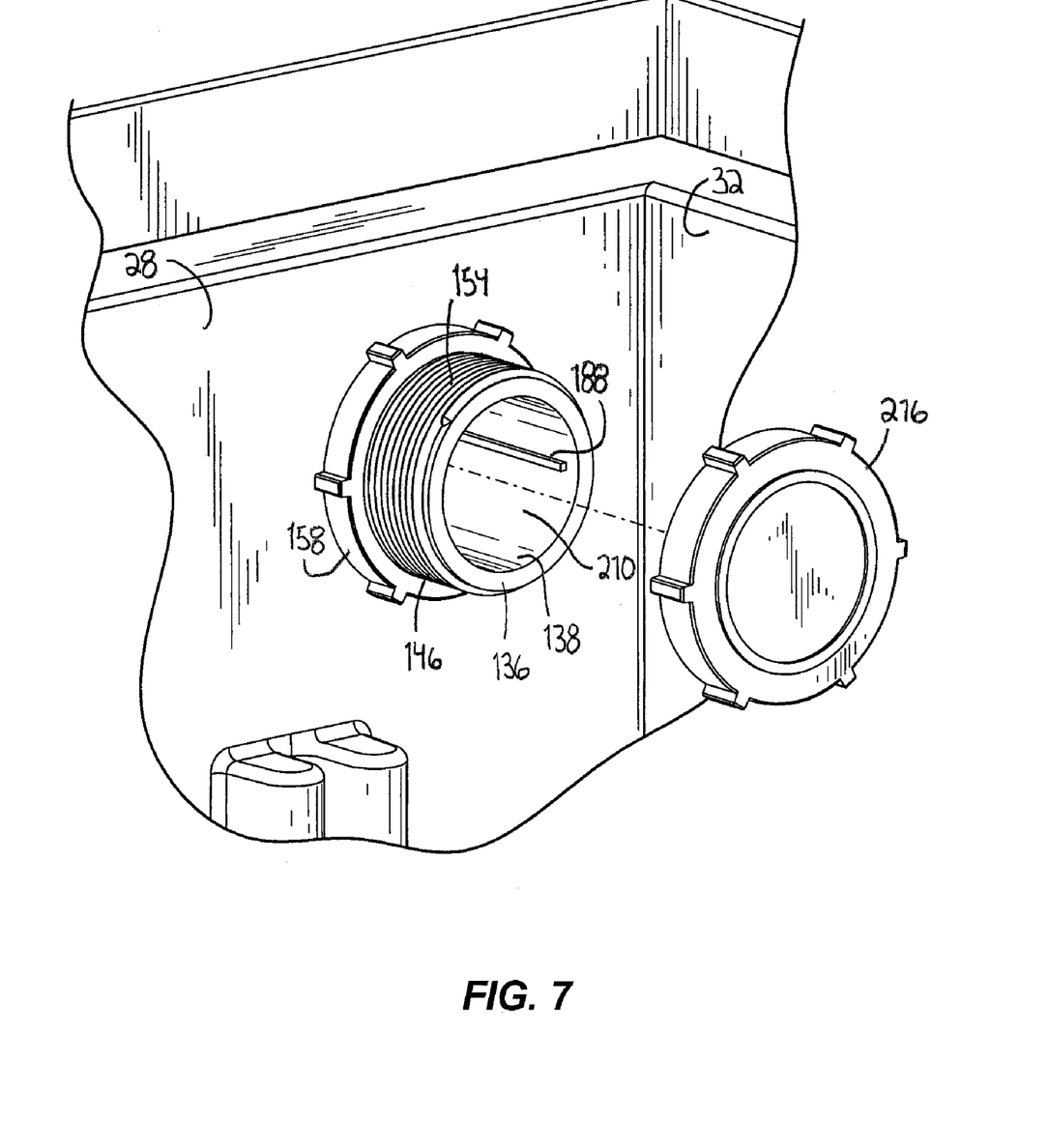
FIG. 7 is a partially exploded view of a portion of the interceptor of FIG. 1 illustrating a cap exploded from an outlet coupling of the interceptor.

Referring to FIGS. 2a, 3, and 7 the container 20 further includes second and third outlets 210 and 212. The second outlet 210 extends through the sidewall 28 near the sidewall 32 and the third outlet 212 extends through the sidewall 30 opposite the sidewall 28 and near the sidewall 32. The second and third outlets 210 and 212 each receive an outlet coupling 136 that is the same as the outlet coupling 136 discussed above with regard to the first outlet aperture 134 and therefore like components have been given like reference numbers. Furthermore, the second and third outlets 210 and 212 are located the same distance H4 above the base 22 of the container 20 as the first outlet aperture 134 such that the second and third outlets 210 and 212 define the same static fluid line 18 (see FIG. 1).

Referring to FIGS. 3 and 7, threaded caps 216 are coupled to the threaded attachment portion 154 of the couplings 136 that extend through the second and third outlet apertures 210 and 212. In the illustrated construction, a threaded connection between the caps 216 and the couplings 136 is utilized such that the caps 216 can be removed from the couplings 136, the purpose of which will be discussed below. The caps 216 prevent fluid communication through the bores 138 of the couplings 136 or through the outlet apertures 210 and 212. An o-ring seal can be located between the cap 216 and the coupling 136 to further inhibit fluid communication through the couplings 136.

Referring to FIG. 3, the outlet conduit baffle 168 can be coupled to any of the outlet couplings 136 using the threaded collar 192, and typically the caps 216 are coupled to the remaining couplings 136. Therefore, one of the couplings 136 provides an outlet for the interceptor 10.

With continued reference to FIG. 3, the second and third outlets 210 and 212 generally define outlet flow directions 220 and 222, respectively, or directions in which the material, fluid, etc. that exits the separation chamber 46 flows as it exits the interceptor 10. In the illustrated construction, the sidewall 28 is substantially normal to the sidewall 32 such that the outlet flow direction 220 through the sidewall 28 is substantially normal to the outlet flow direction 166 through the sidewall 32. Likewise, the sidewall 30 is substantially normal to the sidewall 32 such the outlet flow direction 222 through the sidewall 30 is substantially normal to the outlet flow direction 166 through the sidewall 32. Furthermore, the outlet flow direction 220 through the sidewall 28 is generally 180 degrees from or in the opposite direction as the outlet flow direction 222 through the sidewall 30. While the illustrated outlet flow directions 166, 220, and 222 are spaced at 90 degree increments, in other constructions, the outlet flow directions can be spaced at other suitable increments, such as 45 degree increments and the like. In such constructions, the sidewalls of the container may take other suitable arrangements to facilitate other angular spacing of the outlet flow directions.

The user can couple the outlet baffle 168 to any one of the couplings 136 to achieve the desired outlet flow direction 166, 220, and 222 and the user can couple the caps 216 to the remaining couplings 136. It can be desirable to select from the outlet flow directions 166, 220, or 222 depending on the relation between the inlet and outlet pipes. For example, in one application, the inlet and outlet pipes can be aligned such that is desirable to utilize the outlet aperture 134 that extends through the sidewall 32 while in other applications the inlet and outlet pipes can be arranged such that it is desirable that the outlet extends through one of the sidewalls 28 or 30.

Referring to FIGS. 2b and 3, the caps 216 facilitate pressuring testing the inlet pipe 80, the outlet pipe 162, and the connection between the inlet and outlet pipes 80 and 162 and the inlet and outlet couplings 56 and 136, respectively. After the interceptor 10 is connected to the inlet and outlet pipes 80 and 162, the inlet and outlet pipes 80 and 162 can be pressure tested. As would be understood by one of skill in the art, the pressure test typically includes pressurizing the inlet and outlet pipes 80 and 162 with air or water and measuring or monitoring the loss of air pressure or water from within the pipes 80 and 162.

In the illustrated construction, to conduct the pressure test the inlet diffuser 86 and the outlet conduit baffle 168 are removed from the inlet coupling 56 and the outlet coupling 136, respectively, by untightening or rotating the respective locking collars 118 and 192. Then, the caps 216 are coupled to the threaded attachment portions 64 and 146 of the respective couplings 56 and 136 by threading the caps 216 onto the attachment portions 64 and 146. Then, pressurized air is supplied to the inlet and outlet pipes 80 and 162 to pressure test the pipes and connections. Because the caps 216 are coupled to the couplings 56 and 136 within the separation chamber 46, the caps 216 allow the connection between the inlet pipe 80 and the inlet coupling 56 and the connection between the outlet pipe 162 and the outlet coupling 136 to be pressure tested. After the pressure test is completed, the inlet diffuser 86 and the outlet baffle 168 are reattached to the inlet coupling 56 and the outlet coupling 136, respectively, using the respective locking collars 118 and 192. While both the inlet and outlet pipes 80 and 162 were pressure tested in the method discussed above, in other methods of pressure testing the interceptor system, only one of the inlet and outlet pipes 80 and 162 may be pressure tested.

Referring to FIGS. 1 and 2a, in operation, the mixture to be separated by the interceptor 10, grease, water, and solids in the illustrated application, is supplied to the interceptor 10 through the inlet pipe 80 by gravity at an inlet flow rate. The mixture travels through the bore 58 of the inlet coupling 56 and passes through the orifice 102 of the inlet diffuser 86. The orifice 102 having an area less than the cross sectional area of the bore 58 or inlet pipe 80 restricts or decreases the inlet flow rate of the mixture but increases a velocity of the mixture.

After the mixture travels through the orifice 102, the mixture is directed downwardly by the inlet diffuser 86 as represented by arrow 230 of FIG. 1. Then, the mixture exits the diffuser 86 through the elongated outlet apertures 124 and 126 and enters the separation chamber 46. Referring to FIG. 3, the mixture exits the inlet diffuser 86 to generally define inlet flow directions, represented by arrows 232, that are substantially normal to the mixture flow direction 16.

Referring to FIGS. 1 and 2a, because the outlet area (total area of both outlet apertures 124 and 126) is greater than the area of the inlet orifice 102, the velocity of the mixture is reduced in the flow path between the inlet orifice 102 and the outlet apertures 124 and 126. Furthermore, the outlet apertures 124 and 126 are elongated vertically and are beneath the static fluid line 18, and therefore, the mixture enters the separation chamber 46 below the static fluid line 18 and generally evenly distributed along the entire height H2 of the apertures 124 and 126. Such a configuration has been found allow the mixture to enter the separation chamber 46 at an acceptable flow rate while minimizing the disruption to or remixing of the materials separated within the chamber 46. Furthermore, because the outlet apertures 124 and 126 are located beneath the static fluid line 18, the inlet diffuser 86 also functions as a sewer gas trap.

Referring to FIG. 1, after the mixture exits the apertures 124 and 126, the mixture generally travels in the mixture flow direction 16, toward the outlet end 14 of the container 20 and begins to separate. In the illustrated application, the grease in the mixture tends to float or rise, represented by arrows 234, to form a grease layer 236 on top of the water, while solids 240 generally collect on the base 22 of the container 20. Because the grease generally floats on the water, the grease typically does not enter the inlet 200 of the outlet baffle conduit 168 located at the outlet end 14 of the container 20 near the base 22. Then, as more of the mixture enters the container 20, the active fluid line increases (above the static fluid line 18), causing the water located within the outlet baffle conduit 168 to exit the separation chamber 46 through the outlet 134 and flow into the outlet pipe 162. The outlet pipe 162 can then transport the water to a sewer or any suitable disposal source. Periodically, the cover 42 can be removed and the grease 236 can be removed from the container 20 using any suitable method.

Figure 8:
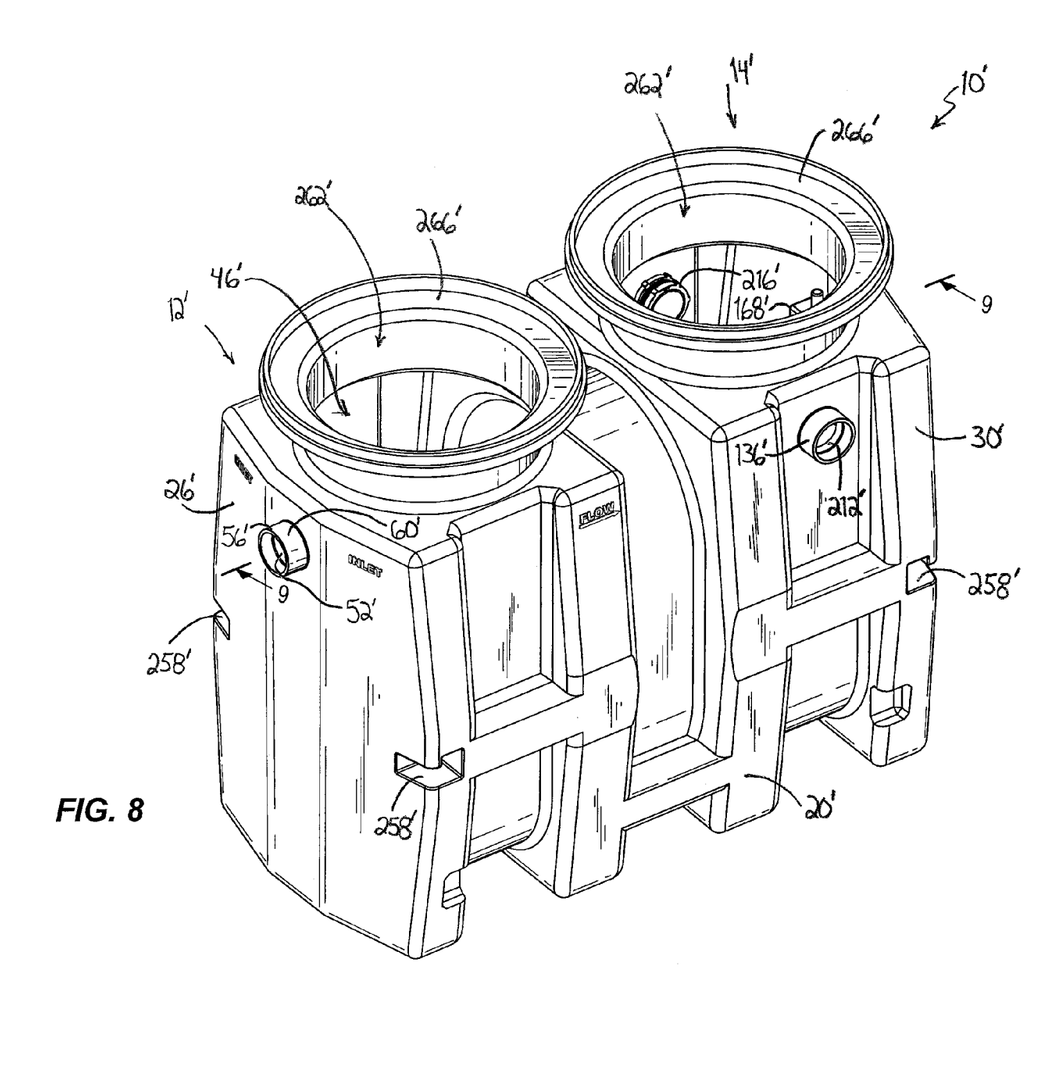
FIG. 8 is a perspective view of an alternative construction of an interceptor embodying the present invention.
Figure 9:
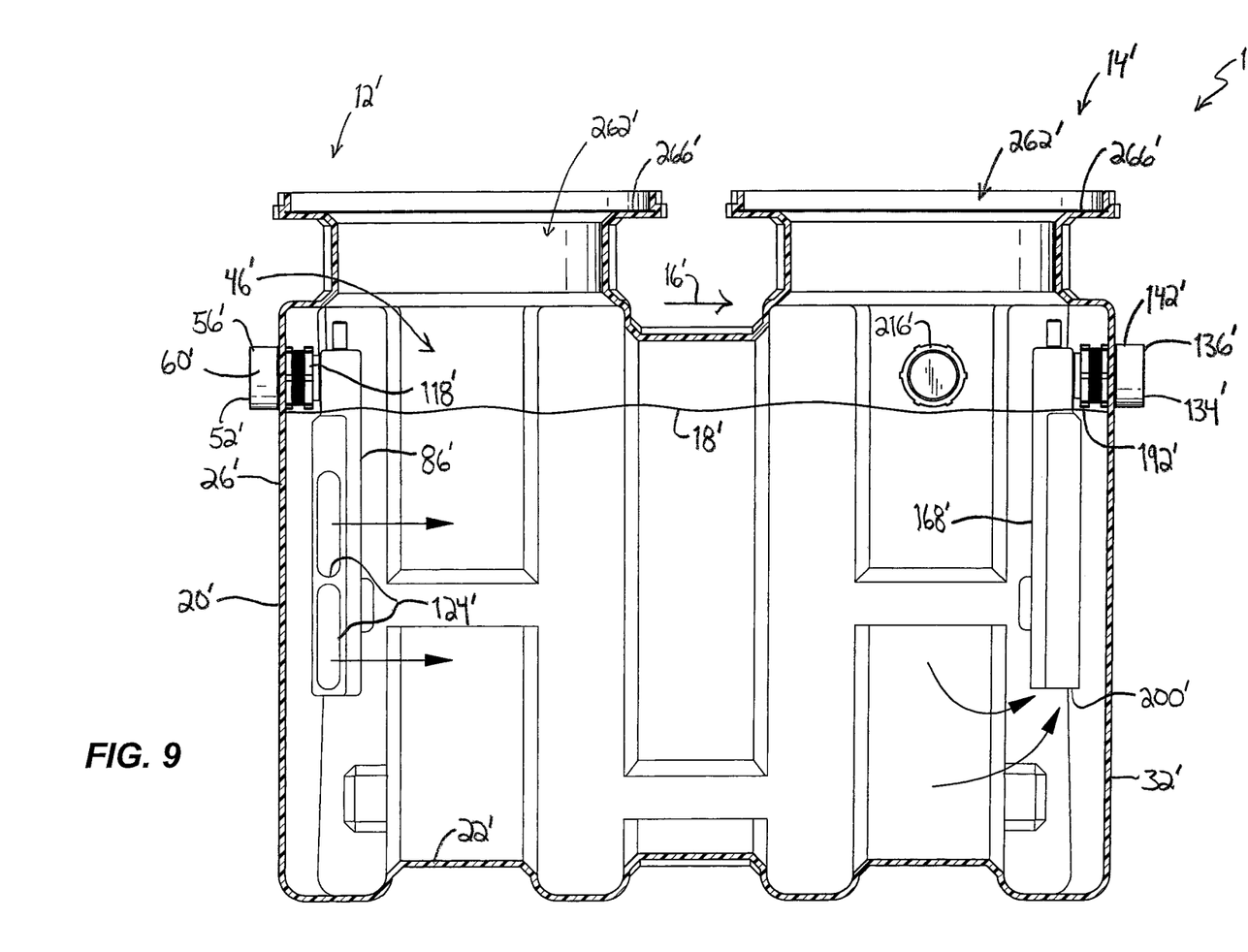
FIG. 9 is a cross-sectional view of the interceptor of FIG. 8 taken along line 9-9 of FIG. 8.

FIGS. 8 and 9 illustrate an alternative construction of the interceptor 10 of FIGS. 1-7. The interceptor 10' of FIGS. 8 and 9 is substantially the same as the interceptor 10 of FIGS. 1-7 and like components have been give like reference numbers plus a prime symbol. Also, the operation of the interceptor 10' is substantially the same as the operation of the interceptor 10 of FIGS. 1-7.

In one embodiment, the interceptor 10' of FIGS. 8 and 9 is particularly suited for applications with relatively higher mixture inlet flow rates than the interceptor 10 of FIGS. 1-7. For example, in one embodiment, the interceptor 10 of FIGS. 1-7 can be scaled or sized to accommodate inlet flow rates of the mixture from about 10 gallons per minute (GPM) to about 100 GPM, and the interceptor 10' of FIGS. 8-9 can be scaled or sized to accommodate inlet flow rates of the mixture from about 150 GPM to about 500 GPM. Of course, in other constructions, the interceptors 10, 10' can be sized to accommodate virtually any suitable inlet flow rate of the mixture.

Referring to FIG. 8, the interceptor 10' further includes handles 258' that can be utilized to carry the interceptor 10'. The interceptor 10' also includes openings 262' that extend through a top portion of the container 20'. The openings 262' facilitate cleanout of the interceptor 10'. A flange 266' surrounds each of the openings 262', and the flanges 266' can receive a cover to close the respective openings 262'.

Various features and advantages of the invention are set forth in the following claims.

What is claimed is:

1. An interceptor configured to at least partially separate a mixture of a first material and a second material, the first material being a fluid, the interceptor comprising:
   a container having a base and a sidewall portion that extends upwardly from the base to at least partially define a separation chamber configured to receive the mixture and to facilitate separation of the first and second materials;
   an inlet aperture configured to provide fluid communication between the separation chamber and an inlet conduit that delivers the mixture to the interceptor;
   an inlet diffuser in fluid communication with the inlet aperture, the inlet diffuser including a body portion located within the separation chamber and an elongated outlet aperture that extends through the body portion to provide fluid communication between the inlet conduit and the separation chamber; and
   an inlet coupling that extends through the inlet aperture, the inlet coupling configured to couple the inlet conduit and the inlet diffuser, wherein the inlet coupling includes a threaded portion located within the separation chamber, the interceptor further comprising a locking collar coupled to the body portion and rotatable relative to the body portion to threadably engage with the threaded portion of the inlet coupling within the separation chamber to removably couple the inlet diffuser to the inlet coupling.

2. The interceptor of claim 1, wherein the interceptor defines a static fluid line, and wherein the elongated outlet aperture of the inlet diffuser is located beneath the static fluid line.

3. The interceptor of claim 1, wherein the interceptor defines an inlet end portion and an outlet end portion such that the first material generally flows from the inlet end portion toward the outlet end portion to define a mixture flow direction, wherein the elongated outlet aperture defines an outlet flow direction of the inlet diffuser that is substantially normal to the mixture flow direction.

4. The interceptor of claim 1, wherein the interceptor defines an inlet end portion and an outlet end portion such that the first material generally flows from the inlet end portion toward the outlet end portion to define a mixture flow direction, wherein the elongated outlet aperture defines an outlet flow direction of the inlet diffuser that is generally opposite the mixture flow direction.

5. The interceptor of claim 1, wherein the interceptor defines a static fluid line located a height above the base, wherein the elongated outlet aperture defines a height and a width measured normal to the height, and wherein the height of the elongated outlet aperture is greater than the width.

6. The interceptor of claim 5, wherein an aspect ratio of the elongated outlet aperture is defined as the height of the elongated outlet aperture divided by the width, and wherein the aspect ratio is greater than about 2.

7. The interceptor of claim 6, wherein the aspect ratio is greater than about 3.

8. The interceptor of claim 1, wherein the inlet diffuser includes a flow control orifice configured to reduce a flow rate of the mixture entering the separation chamber.

9. The interceptor of claim 8, wherein the flow control orifice is integrally formed with the inlet diffuser as a single piece.

10. The interceptor of claim 8, wherein the flow control orifice defines an area, wherein the elongated outlet aperture defines an area, and wherein the area of the elongated outlet aperture is greater than the area of the flow control orifice.

11. The interceptor of claim 1, wherein the inlet diffuser further includes a second elongated outlet aperture aligned with the first elongated outlet aperture.

12. The interceptor of claim 1, wherein the inlet coupling includes a bore, wherein the inlet diffuser includes a generally cylindrical coupling portion that extends from the body portion, and wherein the coupling portion is received in the bore of the inlet coupling.

13. An interceptor configured to at least partially separate a mixture of a first material and a second material, the first material being a fluid, the interceptor comprising:
 a container having a base and a sidewall portion that extends upwardly from the base to at least partially define a separation chamber configured to receive the mixture and to facilitate separation of the first and second materials;
 an inlet aperture configured to provide fluid communication between the separation chamber and an inlet conduit that delivers the mixture to the interceptor; and
 an inlet diffuser that includes an inlet flow control orifice that restricts a flow of the mixture and a body portion located within the separation chamber, the body portion including an outlet aperture that extends through the body portion to provide fluid communication between the inlet conduit and the separation chamber, wherein the inlet flow control orifice and the body portion of the inlet diffuser are integrally formed as a single piece.

14. The interceptor of claim 13, wherein the inlet flow control orifice defines an area, wherein the outlet aperture defines an area, and wherein the area of the outlet aperture is greater than the area of the inlet flow control orifice.

15. The interceptor of claim 13, further comprising:
 an inlet coupling that extends through the inlet aperture, the inlet coupling configured to facilitate fluid communication between the inlet conduit and the inlet diffuser, the inlet coupling including an attachment portion located within the separation chamber,
 a fastener that couples to the attachment portion of the inlet coupling within the separation chamber to removably couple the inlet diffuser to the inlet coupling.

16. The interceptor of claim 15, wherein the attachment portion of the inlet coupling includes a threaded portion, and wherein the fastener includes a nut.

17. An interceptor configured to at least partially separate a mixture of a first material and a second material, the first material being a fluid and the interceptor defining a static fluid line, the interceptor comprising:
 a container having a base and a sidewall portion that extends upwardly from the base to at least partially define a separation chamber configured to receive the mixture and to facilitate separation of the first and second materials;
 an inlet aperture configured to provide fluid communication between the separation chamber and an inlet conduit that delivers the mixture to the interceptor; and
 an inlet diffuser in fluid communication with the inlet aperture, the inlet diffuser including,
 a body portion located within the separation chamber, the body portion defining a cavity,
 an outlet aperture that extends through the body portion below the static fluid line to provide fluid communication between the inlet conduit and the separation chamber, and
 a vent passageway that extends through the body portion, the passageway having a lower portion disposed below the static fluid line to provide fluid communication between the cavity and the separation chamber.

18. An interceptor configured to at least partially separate a mixture of a first material and a second material, the first material being a fluid, the interceptor comprising:
 a container having a base and a sidewall portion that extends upwardly from the base to at least partially define a separation chamber configured to receive the mixture and to facilitate separation of the first and second materials;
 an inlet aperture configured to provide fluid communication between the separation chamber and an inlet conduit that delivers the mixture to the interceptor;
 an inlet diffuser in fluid communication with the inlet aperture, the inlet diffuser including a body portion located within the separation chamber and an elongated outlet aperture that extends through the body portion to provide fluid communication between the inlet conduit and the separation chamber; and
 an inlet coupling that extends through the inlet aperture, the inlet coupling configured to couple the inlet conduit and the inlet diffuser, wherein the inlet coupling includes a bore, wherein the inlet diffuser includes a generally cylindrical coupling portion that extends from the body portion, and wherein the coupling portion is received in the bore of the inlet coupling, wherein a flow control orifice extends through the coupling portion of the inlet diffuser, the flow control orifice configured to reduce a flow rate of the mixture entering the separation chamber.

19. An interceptor configured to at least partially separate a mixture of a first material and a second material, the first material being a fluid, the interceptor comprising:
 a container having a base and a sidewall portion that extends upwardly from the base to at least partially define a separation chamber configured to receive the mixture and to facilitate separation of the first and second materials;
 an inlet aperture configured to provide fluid communication between the separation chamber and an inlet conduit that delivers the mixture to the interceptor; and
 an inlet diffuser in fluid communication with the inlet aperture, the inlet diffuser including a body portion located within the separation chamber and an elongated outlet aperture that extends through the body portion to provide fluid communication between the inlet conduit and the separation chamber, wherein the inlet diffuser defines a height, wherein the elongated aperture defines a height, wherein a ratio is defined as the height of the elongated aperture divided by the height of the inlet diffuser, and wherein the ratio is greater than about 0.4.

20. An interceptor configured to at least partially separate a mixture of a first material and a second material, the first material being a fluid, the interceptor comprising:
 a container having a base and a sidewall portion that extends upwardly from the base to at least partially define a separation chamber configured to receive the mixture and to facilitate separation of the first and second materials;

an inlet aperture configured to provide fluid communication between the separation chamber and an inlet conduit that delivers the mixture to the interceptor; and an inlet diffuser in fluid communication with the inlet aperture, the inlet diffuser including a body portion located within the separation chamber and an elongated outlet aperture that extends through the body portion to provide fluid communication between the inlet conduit and the separation chamber, wherein the elongated outlet aperture defines a height, wherein the interceptor defines a static fluid line located a distance above the base of the container, wherein a ratio is defined as the height of the outlet aperture divided by the distance of the static fluid line above the base, and wherein the ratio is greater than about 0.32.

* * * * *

UNITED STATES PATENT AND TRADEMARK OFFICE
Certificate

Patent No. 7,481,321 B2                                                                                                Patented: January 27, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Martin B. Ismert, Milwaukee, WI (US); and Todd E. Uhlenhake, Burlington, WI (US).

Signed and Sealed this Sixth Day of April 2010.

*Supervisory Patent Examiner*  
DUANE SMITH  
Art Unit 1797